April 2, 1968     W. DUBUSKER ET AL     3,375,570

FLUXLESS BRAZING OF ALUMINUM HEAT EXCHANGERS

Filed March 15, 1965     2 Sheets—Sheet 1

INVENTORS
WILLIAM DUBUSKER
PHILIP R. ROBERTSON
ALBERT A. OLIVER JR.
JAMES G. BENNETT JR.
MELVIN E. SCHMIDT

BY *Gravely, Lieder + Woodruff*

ATTORNEYS

April 2, 1968    W. DUBUSKER ET AL    3,375,570
FLUXLESS BRAZING OF ALUMINUM HEAT EXCHANGERS
Filed March 15, 1965    2 Sheets-Sheet 2

INVENTORS
WILLIAM DUBUSKER
PHILIP R. ROBERTSON
ALBERT A. OLIVER JR.
JAMES G. BENNETT JR.
MELVIN E. SCHMIDT
BY
*Gravely, Lieder & Woodruff*
ATTORNEYS

United States Patent Office 3,375,570
Patented Apr. 2, 1968

3,375,570
FLUXLESS BRAZING OF ALUMINUM
HEAT EXCHANGERS
William Dubusker, Creve Coeur, Mo., Philip R. Robertson, Grafton, Ill., and Albert A. Oliver, Jr., and James G. Bennett, Jr., Florissant, and Melvin E. Schmidt, Ferguson, Mo., assignors to McDonnell Aircraft Corporation, St. Louis, Mo., a corporation of Maryland
Filed Mar. 15, 1965, Ser. No. 439,798
6 Claims. (Cl. 29—472.3)

ABSTRACT OF THE DISCLOSURE

A method of fluxless brazing of all aluminum heat exchangers and the like which consist of opposed facing sheets separated by a corrugated spacer. In the process the inner surfaces of the spacing sheets are precoated with fluxless braze, the parts are carefully cleaned, preassembled using pins and prepositioned openings in the parts, and the assembly is inserted into a flexible stainless steel envelope having a jig affixed thereto so positioned as to allow for expansion of the assembly upon heating. The envelope then is sealed and placed into a copper brazing die where the part is brazed without outside pressure under a positive flow if argon gas through the envelope and the assembly.

---

The invention described herein was made in the performance of work under a NASA contract and is subject to the provisions of section 305 of the National Aeronautics and Space Act of 1958, Public Law 85–568 (72 Stat. 435; 42 U.S.C. 2457).

The present invention relates to fluxless brazing and more particularly to fabrication techniques for thermally controlled mounting bases for equipment requiring operation in environmental temperature extremes.

One of the most difficult problems with equipment designed to operate in space environments, that subject such equipment to temperature extremes, in maintaining the equipment within certain temperature limits. Compounding the problem is the necessity of forming intricate heat exchange systems in equipment mounting bases for controlling equipment temperature. Of course, it is desirable that the equipment mounting base made by relatively inexpensive methods and of relatively lightweight materials. A most desirable material from the standpoint of structural strength and lightweight is aluminum. Likewise, to save on fabrication cost it is desirable to use the well-known dip brazing techniques for aluminum assemblies. Briefly, the process includes cleaning intricate parts for assemblies, both physically and chemically to remove all harmful deposits and to remove any oxides on the surface. Next, the parts are preassembled with brazing material. Then they are subjected to a salt bath heated to brazing temperature which acts as a flux for brazing. The parts after the dip brazing process are again cleaned to remove as much remaining salt or flux deposit as possible. However, because of the intricate construction of the parts successful removal of the foreign deposit or flux is impractical.

The present invention affords a technique of brazing assemblies of intricate parts, such as mounting bases for components in which the mounting base is a heat transfer and temperature control assembly. To avoid previous problems, the process appertaining to the invention briefly includes a pre-cleaning and deoxidizing step for the disassembled parts that form the mounting base. Next the clean and deoxidized parts are preassembled on aligning pins or devices. The portions of the parts to be joined together are clad with a brazing material at least in areas to be brazed together. After the parts have been completely assembled for the brazing step, they are positioned in a retort and sealed therein. The retort is provided with a gas inlet and outlet. The inlet line is attached preferably to an argon source of high purity, and the outlet is attached to a vacuum source. The retort is subjected to evacuation and is back-filled with Argon for several purging cycles. Then after insuring that the retort includes only argon, the retort is subjected to a uniform heating at the brazing temperature. After a sufficient period of time to permit flowing of a brazing material, the assembly, still within the retort, is cooled at a slow rate. After the assembly has been cooled sufficiently, the retort is cut open and the brazed assembly removed. The vent holes in the assembly are sealed and inlet couplings are welded in the proper position. The assembly which is a completed mounting base is now tested to insure that it is flat and does not have any leaks after which it is alodined by the conventional process for aluminum being sure that the alodine solution is not permitted within the assembly.

By the process just described, it will be appreciated that the complete assembly has been fabricated by brazing techniques without the use of flux or salt as encountered in the normal dip brazing process.

It is therefore an important objective of the invention to provide a fluxless brazing process for intricately shaped assemblies.

It is another object of the invention to provide a process for fluxless brazing heat exchanger assemblies of aluminum.

It is another objective of the invention to provide a process for fluxless brazing aluminum assemblies which have intricate shapes by uniformly heating the assembly in a controlled inert gas environment to a temperature at which the brazing material uniformly flows to complete the brazing without melting the base material.

It is another objective of the invention to provide a process for fluxless brazing wherein aluminum assemblies are pre-cleaned and assembled with brazing material in the areas to be joined and thereafter subjected to an inert uniform brazing environment which affords uniform expansion and contraction of the material to maintain uniform tolerances for the assemblies.

It is another objective of the invention to provide a fluxless brazing process in which intricate heat transfer assemblies are brazed together by preassembling the previously cleaned assembly with brazing material in the areas to be joined, sealing the preassembled assembly in a retort provided with a non-oxidizing atmosphere, placing the retort in contact with a uniform heat source to provide a uniform brazing temperature throughout the entire assembly, maintaining the assembly at the brazing temperature to join the parts, thereafter cooling the assembly at a uniform rate within the retort and then removing the assembly from the retort.

These and other objectives and advantages of the invention will become apparent from the ensuing description taken in conjunction with the appended claims and drawings wherein:

Figure 1:
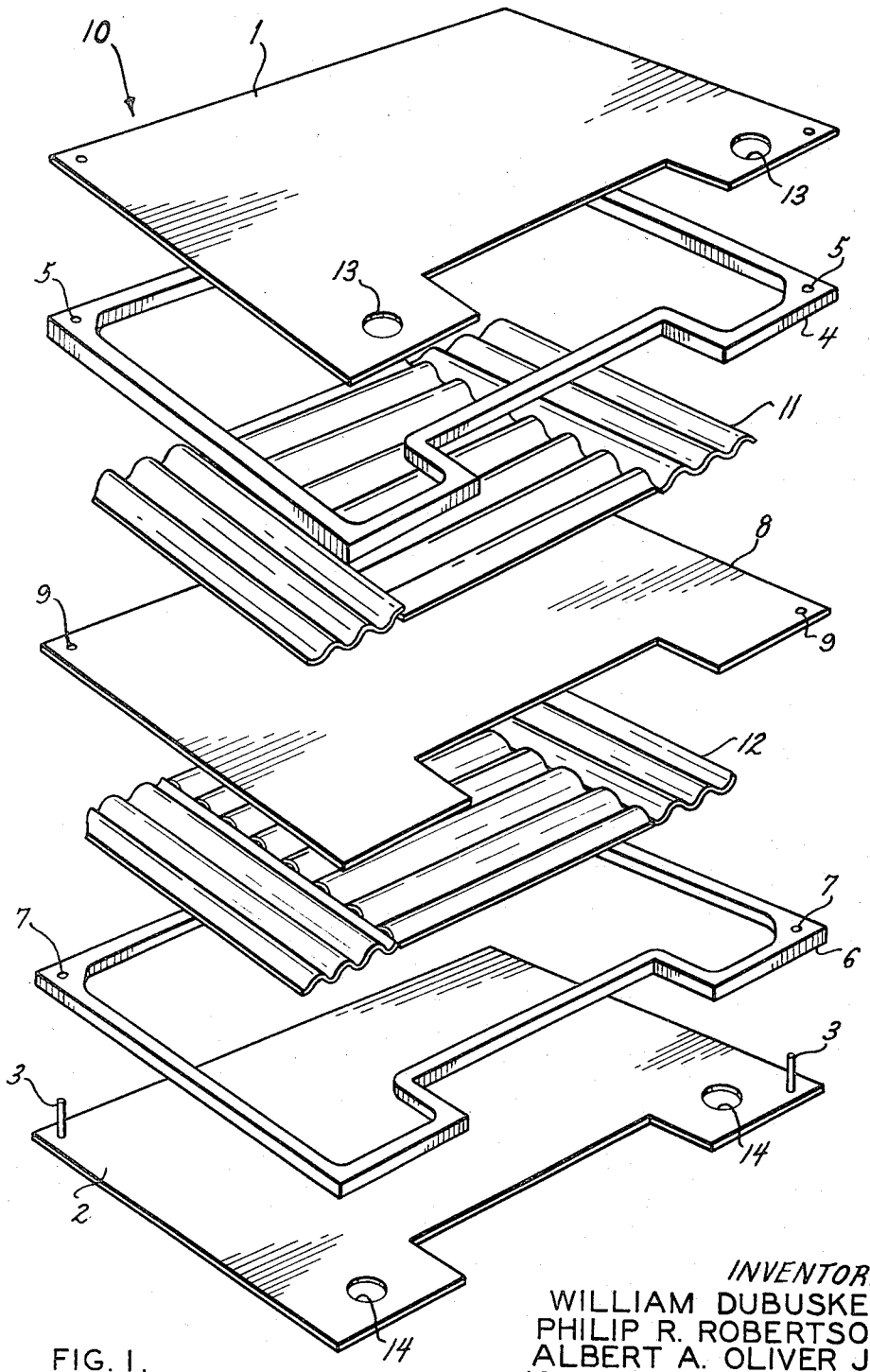
FIG. 1 is an exploded view of an assembly to be brazed.

Referring now to the drawings and particularly FIG. 1 the parts of a typical heat transfer mounting base or assembly 10 are illustrated. The particular assembly 10 used in disclosing the invention is a heat exchanger. The assembly 10 consists of a top plate or skin 1 which has a brazing material clad on the underside or internal surface. A similar bottom plate 2 has brazing material clad on its top side or internal surface. The bottom plate 2 carries aligning pins 3 to secure the assembly 10 in proper alignment during brazing. A top frame 4 of aluminum without brazing material cladding is provided with aligning holes 5 which will be fitted to aligning pins 3. Likewise, a lower frame 6 without brazing material cladding is provided with aligning holes 7 adapted to fit over pins 3. A divider plate 8 with aligning pin holes 9 is provided intermediate frame 4 and frame 6. The divider plate 8 is clad on both sides with brazing material. Corrugated top core 11 is placed within frame 4 and is in contact with the brazing material on divider plate 8 and on top plate or skin 1. Likewise, corrugated bottom core 12 is provided within frame 6 and is in physical contact with the brazing material on divider plate 8 and bottom plate or skin 2. The top plate 1 has a pair of holes 13 and bottom plate 2 has similar pair of holes 14. The holes 13 and 14 are for the purpose of attaching inlet and outlet fittings after the assembly has been brazed. During brazing these holes provide for evacuation of air from the assembly and filling such with Argon to maintain an inert atmosphere around the assembly during brazing.

Figure 2:
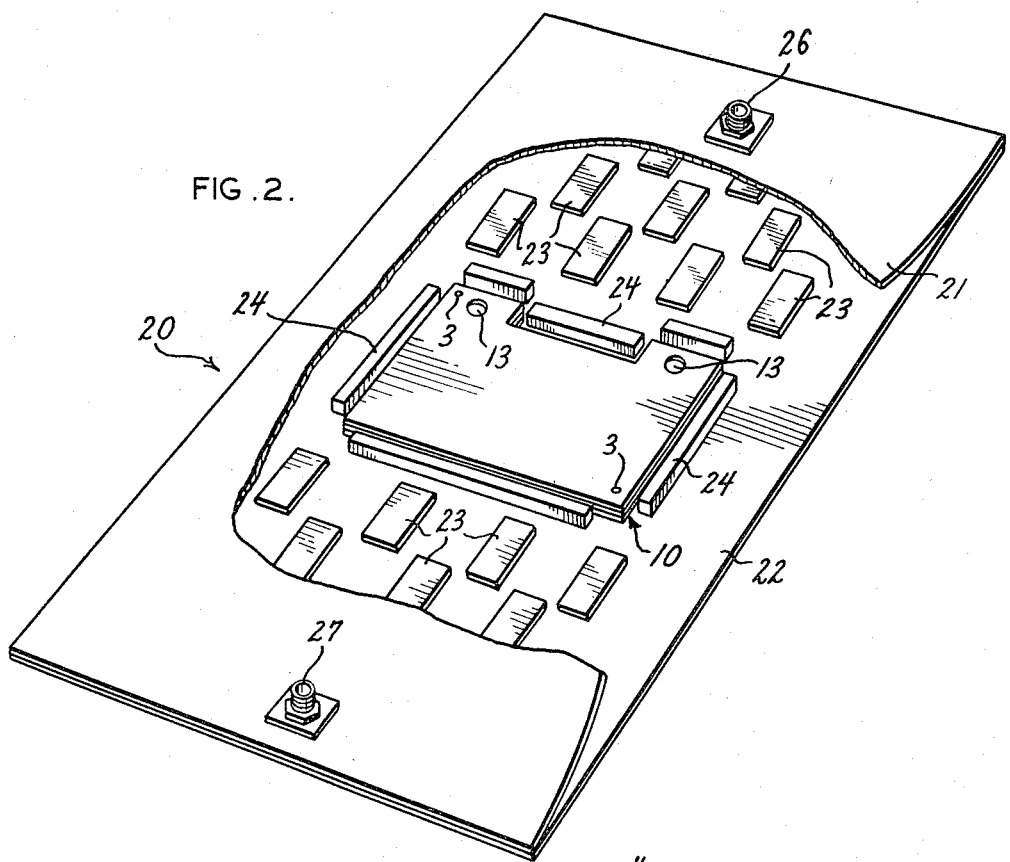
FIG. 2 is a perspective view partly broken away illustrating the preassembled assembly within a retort.

Referring now to FIG. 2, the process employs a retort 20, preferably of stainless steel for maintaining an inert environment, which consists of a pair of thin walls or sheets 21 and 22. Within the retort, spacers 23 are provided to maintain sheets 21 and 22 of the retort separated and permit gas flow therewithin. The assembly 10 is positioned within the retort and maintained in the proper position by locators 24. In order to maintain the environment desired for fluxless brazing retort 20 has an inlet fitting 26 and an outlet fitting 27 which are coupled to an inert gas source such as argon and a vacuum pump suitable for reducing the pressure within the retort to 0.5 micron, thus the retort can be evacuated to a pressure to insure removal of all oxygen therein and then be back-filled with an inert gas, such as argon. It will be noted that in the retort 20, holes 13 and 14 of the assembly 10 are open, and the assembly 10 is freely held in proper position by the locators 24 which allow for expansion and contraction.

Figure 3:
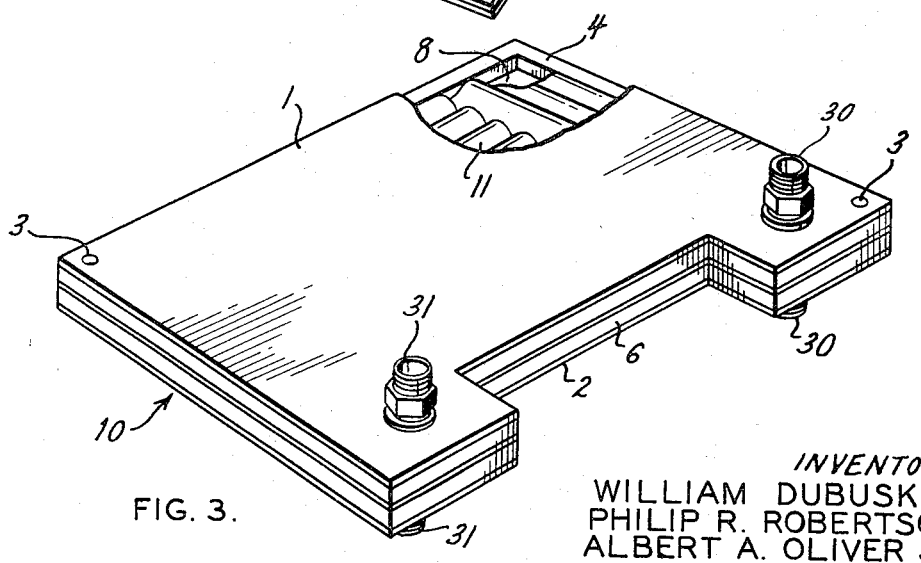
FIG. 3 illustrates, partly broken away, the complete assembly.

Referring to FIG. 3 after the assembly has been fluxless brazed in the retort just described, inlet fittings 30 and outlet fittings 31 are welded to the complete assembly. Of course, it will be appreciated that aligning pins 3 are secured to the assembly during the fluxless brazing.

In a specific example, assembly 10 of FIG. 1 was processed in the following sequence. The various parts (of suitable 3003 and 1100 aluminum clad and unclad) were prefitted on the alignment pins to make sure that the finished parts would make a properly brazed assembly. The parts were then individually washed with a detergent until a water-brake-free surface was achieved. The parts were then rinsed with cold tap water. Next the parts were immersed in a deoxidizing tank containing "Turco, Smut, Go. No. 1," a well known deoxidizing solution for aluminum. The parts remained in the deoxidizing solution for a period of 20 minutes, and then were removed and rinsed with cold tap water. Parts were dried by blowing certified argon (with a minus 80° F. dew point) thereover. To prevent contamination of the deoxidizing solution, the tank is covered with a plastic sheet when not in use. Next the cleaned and dried parts having brazing material cladding in the areas to be joined were assembled on the aligning pins 3, noted in FIG. 1, by personnel wearing lint free white gloves. After assembling the parts depicted in FIG. 1, the aluminum alignment pins were compressed by peening to retain the heat exchange assembly 10 together. At this point the heat exchange assembly 10 was ready for brazing in the retort.

The retort 20 (see FIG. 2) for controlled environment, fluxless brazing included two pieces of 10 mil thick stainless steel No. 310 (or similar grade stainless steel). As seen in FIG. 2, the bottom sheet of stainless steel had stainless steel spacer bars 23 welded thereto and stainless steel locators 24 welded thereto. The locators 24 were bars welded to the bottom sheet and were ground to the finished dimensions of the heat exchanger. A stainless steel inlet coupling 26 and outlet coupling 27 were welded in holes provided in the top sheet of stainless steel. The heat exchanger 10 was placed within the retort positioned by locators 24 and thereafter the fourth side of retort 20 was sealed by welding. Of course, it will be understood that the stainless steel retort had a spotless clean interior and also it will be appreciated that the locators 24 in the retort had been spaced to allow for expansion of the heat exchanger during brazing.

After the stainless steel retort was sealed shut by seam welding, it was placed on a copper heating-cooling platen of sufficient size to extend beyond the area of heat exchanger in all directions. The platen is seated on a heatable die and the die was closed over the stainless steel retort. The heating dies were then preheated to 200° F. Also, the inlet had been connected to a source of certified argon (minus 82° F. dew point) and the outlet had been attached to a vacuum source capable of reducing the pressure within the retort to 10 microns. The pressure within the retort was reduced to 10 microns and then back-filled to atmospheric pressure with the certified argon. This evacuation and back-filling was performed three complete cycles to insure complete purging and removal of air. The retort was then back-filled with argon to a pressure of 10 p.s.i.g. with an argon flow rate of 10 cubic feet per hour maintained throughout the entire brazing cycle. The entire retort preheated to 200° F. was raised to a temperature of 1150° F. and controlled at that temperature. Note, the brazing material melts and flows between 1100° F. and 1140° F. and the parent material melts at 1190° F. to 1210° F. With a sufficient time to permit the heat exchanger assembly to reach 1150° F. and cause the brazing material to flow, the retort was allowed to start cooling and was cooled at a rate of 5° F. per minute down to 600° F. The rate of cooling was then increased and the assembly cooled to 200° F., after which they were cooled to handling temperature.

After the just described cycle was completed the retort 20 was opened and heat exchanger assembly 10 was removed. Next, the inlet and outlet fittings 30 and 31 were heliarc welded in position as depicted in FIG. 3. The completed heat exchanger was also tested at 150 p.s.i.g. with argon gas without any leakage being detected. The heat exchanger was inspected to insure that no variations of more than 10 mils in flatness occurred. The heat exchanger assembly was then accepted as suitable for use.

The foregoing fluxless brazing process was disclosed in connection with fabricating a heat exchanger. However, it will be appreciated that the process is not limited to the particular heating exchanger assembly and may be utilized for enumerable structures having intricate inner cavities from which it would be difficult to clean dip brazing flux or salt in the usual manner.

It will be appreciated that various changes and modifications to the process appertaining to the present invention will be readily apparent to those skilled in the art and all such changes are deemed to be within the scope of the invention defined by the appended claims.

What is claimed is:

1. A method of fluxless brazing all aluminum heat exchangers which include exterior plates and a corrugated spacer sandwiched therebetween to provide a non-corroding all aluminum assembly wherein there is substantially no variation in flatness comprising the steps of
   (a) thoroughly cleaning and deoxidizing the parts to be brazed which include outer facing sheets, at least one of which has port means therein, and an inner corrugated member; wherein said cleaning and deoxidizing includes washing with detergent, rinsing with water, immersion in a deoxidizing solution to remove aluminum oxide film, rinsing with water, and drying with a flow of certified argon, (b) assemblying the said parts prior to an oxide film forming on the said parts into a sandwich structure with the corrugated member between the facing sheets so that the inner surfaces of the sheets engage the outer surfaces of the peaks and valleys of the corrugated member, and the port means provide communication to the corrugations, fluxless braze being positioned between engaging parts of the facing sheets and the corrugated member, (c) positioning the assembly into a flexible envelope having inlet and exhaust ports, (d) sealing the flexible envelope, (e) positioning the envelope into a heating die, (f) connecting the envelope ports to a vacuum source, (g) pulling a vacuum on the envelope and the interior of the assembly, (h) purging the envelope and the interior of the assembly with argon, (i) maintaining a continuous flow of certified argon having a dewpoint of minus 80° F. at a flow of about 10 cubic feet per hour through the envelope and the assembly, (k) heating the parts to about 1150° F. to cause the braze to flow and adhere the parts together, and (l) cooling the parts to 600° F. at the rate of about 5° F. per minute.

2. The method of claim 1 including the step of positioning aligning pins into parts of the assembly to locate the assembly parts in predetermined relation to each other for brazing.

3. The method of claim 1 wherein the exterior plates are precoated with braze.

4. The method of claim 1 wherein the interior of the envelope is provided with spacers approximately the thickness of the assembly and with assembly positioning blocks so located as to allow for linear expansion of the assembly and to locate the assembly in a predetermined position in the envelope.

5. The method of claim 1 wherein the envelope is made of about a ten mil thickness stainless steel.

6. The method of claim 1 wherein the vacuum on the envelope and assembly is about 10 microns.

References Cited

UNITED STATES PATENTS

| | | | |
|---|---|---|---|
| 2,614,517 | 10/1952 | Peterson | 29—494 X |
| 3,011,254 | 12/1961 | Melill | 29—471.1 |
| 3,091,846 | 6/1963 | Henry | 29—494 X |
| 3,321,828 | 5/1967 | Miller | 29—494 X |
| 3,322,517 | 5/1967 | Miller | 29—197.5 |
| 2,834,102 | 5/1958 | Pflumm | 29—497.5 X |
| 2,907,105 | 10/1959 | Ohmi | 29—504 X |
| 2,916,815 | 12/1959 | Donkervoort | 29—504 |
| 2,987,816 | 6/1961 | Noland | 29—501 X |
| 3,063,144 | 11/1962 | Palmour | 29—473.1 |
| 3,063,145 | 11/1962 | Bouton | 29—504 X |
| 3,070,880 | 1/1963 | Davis | 29—498 X |
| 3,081,534 | 3/1963 | Bredza | 29—494 |
| 3,083,452 | 4/1963 | Terrill | 29—498 X |
| 3,180,022 | 4/1965 | Briggs | 29—487 |
| 3,213,532 | 10/1965 | Glaser | 29—498 X |
| 3,235,959 | 2/1966 | Bartoszak | 29—504 X |

JOHN F. CAMPBELL, *Primary Examiner.*

R. F. DROPKIN, *Assistant Examiner.*